Patented Jan. 13, 1948

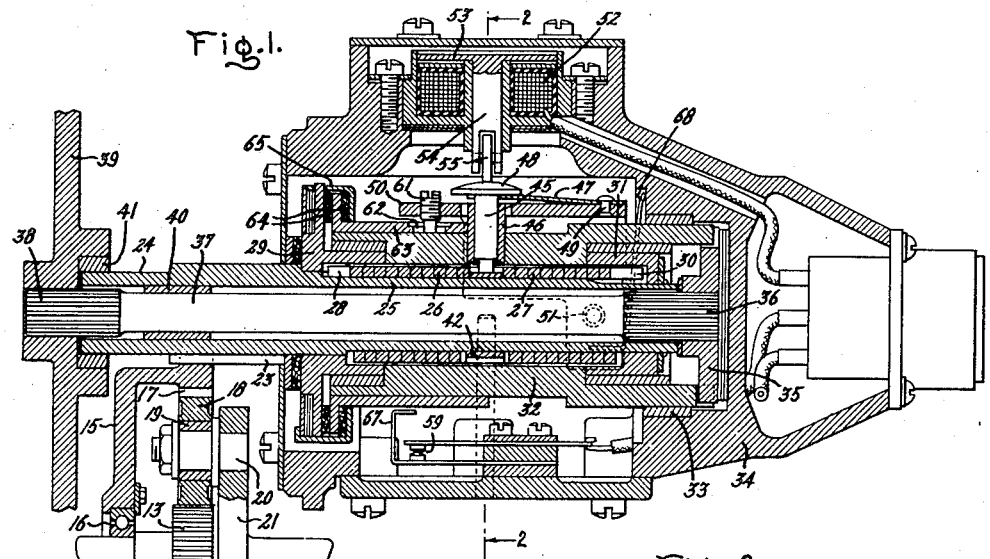

2,434,480

UNITED STATES PATENT OFFICE 2,434,480

BRAKE MECHANISM

Cleophos E. Anderson, Columbia City, Ind., assignor to General Electric Company, a corporation of New York Application December 1, 1943, Serial No. 512,468

3 Claims. (Cl. 188—1)

My invention relates to brake mechanisms for use in connection with driving mechanisms and particularly to driving mechanisms in which such brake mechanism is arranged to provide a driving connection between driving and driven shafts and is adapted to limit the torque transmitted through the driving connection between these shafts to a predetermined safe operating value.

An object of my invention is to provide an improved brake mechanism for use in connection with a driving mechanism and arranged to provide a driving connection between driving and driven shafts and also to limit the torque transmitted through the driving connection to a predetermined value.

Another object of my invention is to provide a brake mechanism for use in connection with a driving mechanism and arranged to form a driving connection between driving and driven shafts with an arrangement for limiting the torque transmitted through the driving connection to a predetermined value and to prevent the formation of the driving connection after it has been released due to overload except after a reversal of the driving shaft.

A further object of my invention is to provide an improved brake mechanism for use in connection with a driving mechanism and arranged to provide a driving connection between a driving and a driven shaft when the driving shaft is operating, to release the driving connection when the source of power connected to the driving shaft is not in operation, and to limit the torque transmitted through the driving connection to a predetermined safe operating value.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a schematic illustration of a driving mechanism including a planetary gear system and clutch embodying my invention; Fig. 2 is a sectional view taken along line 2—2 of Fig. 1; Fig. 3 is a plan view of the spring brake mechanism shown in Figs. 1 and 2; and Fig. 4 is a schematic diagram of the illustrated driving system, together with a driving motor and associated switching device.

Referring to the drawing, I have shown a driving mechanism in which a source of power such as an electric driving motor is provided with field exciting windings 10 arranged to excite a rotatable member or armature 11 to provide for clockwise and counterclockwise rotation of the motor as indicated by the notations C. W. and C. C. W. The armature 11 is provided with a driving connection to a drive shaft 12 on which a spur gear 13 is formed. Torque is adapted to be transmitted from the driving motor shaft 12 to a driven shaft member 14 through a planetary gearing in which the spur gear 13 is arranged as the driving sun gear of the gear system. A ring gear 15 is rotatably supported by a bearing 16 about the drive shaft 12 and is provided with internal gear teeth 17 arranged in engagement with three planet gears 18 rotatably mounted on bearings 19 about stub shafts 20 supported by a planet cage 21 formed on the driven shaft 14. Torque is adapted to be transmitted from the drive shaft 12 and the sun gear 13 to the driven shaft 14 through the planet gears 18 when the ring gear 15 is held stationary. An arrangement is provided for forming this driving connection by holding stationary the ring gear 15 when the driving motor is in operation and to provide for the release of this driving connection both when the torque transmitted through the gear system exceeds a predetermined safe operating value and when the driving motor is not energized. This is obtained by providing a set of external gear teeth 22 on the ring gear 15 arranged in engagement with a load limiting and release gear 23 formed on a rotatably supported auxiliary shaft 24. The shaft 24 is provided with an extension 25 about which a pair of spring brakes 26 and 27 is arranged. The outer end 28 of the spring brake 26 is secured in an opening in a cup member 29 which is secured to the shaft portion 25 by a splined connection, and the outer end 30 of the spring brake 27 is secured in an opening near the end of the shaft portion 25 in a cup-shaped member 31 which is secured to the end of the shaft 25 by a splined connection. These two spring brakes are arranged within a brake sleeve 32 which is rotatably supported in a stationary bearing 33 mounted in a brake housing 34. The end of the brake sleeve 32 near the end of the shaft portion 25 is connected by a splined connection to a coupling element 35 which is secured to a splined end 36 of a relatively small diameter torque rod 37 arranged within the shaft 24. The other end 38 of the torque rod 37 is rigidly secured to a stationary frame 39 by a splined connection, and the adjacent portion of the shaft 37 is supported within the hollow shaft 24 by a suitable bearing 40. The adjacent end of the shaft 24 is rotatably supported on the frame 39 by a bearing 41.

The operation of the spring brakes depends upon the expansion of these spring brakes into engagement with the inner surface of the sleeve 32. This operation is obtained under normal conditions by restraining the free turning movement of the spring brakes 26 and 27 by a stop ring 42 which is rotatably mounted on the shaft portion 25 and between the inner ends of the spring brakes 26 and 27. This stop ring is formed with shoulders 43 and 44 which are adapted to engage the inner ends of the spring brakes 26 and 27 and to prevent rotation of these springs when the driving motor is energized. The outer surface of the stop ring 42 is formed with a plurality of slots into which the end of a locking pin 45 is adapted to seat. This pin 45 is slidably mounted within a sleeve 46 and is resiliently biased away from the stop ring 42 by a leaf spring 47 which engages the under side of the head 48 of the pin 45. This spring 47 is secured by a rivet 49 to the upper surface of a yoke 50 which extends over the sides of the sleeve 32 and is pivotally mounted at 51 on the sleeve 32. When the driving motor is energized, the pin 45 is biased into the slots in the stop ring 42 by an electromagnetic device which includes an exciting coil 52 which is connected across the motor circuit and is supported in the stationary brake housing 34. When this exciting coil 52 is energized, it is adapted to attract an armature 53 which is secured to an operating rod 54, on the lower end of which a contact roller 55 is mounted which engages the pinhead 48 and biases the pin 45 into locking engagement with a slot in the stop ring 42. Thus, when the motor is energized by closing a main line switch 56 and closing a contactor 57 of a selector switch on one of the contacts 58 of the switch, the motor and the electromagnetic exciting coil 52 are both energized through one of the torque limiting switches 59. Under this condition, torque is transmitted from the motor to the shaft 12 and through the sun gear 13, the planet gears 19, the ring gear 15 and the locking gear 23, to the brake shaft 24, and through this shaft to the end 28 or 30 of one of the brakes 26 or 27, depending upon the direction of rotation of the motor. Energization of the solenoid exciting coil 52 draws the armature 53 downwardly and biases the locking pin 45 into engagement with one of the slots in the stop ring 42, thereby preventing rotation of this ring. This substantially prevents turning of the spring brakes, and the torque transmitted to these spring brakes through the ends of the brakes secured to the shaft 24 causes these brakes to expand into engagement with the sleeve 32 and transmit torque through this sleeve to the coupling member 35 and the end of the torque rod 37. Since this torque rod is rigidly fastened to the stationary frame 39, it cannot rotate, but the torque will tend to twist this rod and permit a certain amount of rotational displacement of the sleeve 32. However, this rotational movement is not sufficient to permit any substantial turning of the shaft 24 and, therefore, the ring gear 15 is held against rotation and torque is transmitted to the driven shaft 14 through the planetary gearing system in the conventional manner. This twisting of the torque rod 37 will be proportional to the load transmitted through the gearing. This causes the yoke 50 to turn a slight amount together with the remainder of the brake system, and movement of this yoke is limited by stop screws 60 which are arranged to engage the lower ends of the yoke 50. When the yoke 50 engages these screws, it is pivoted upwardly and thereby lifts the locking pin 45 out of engagement with the stop ring 42, thus releasing the spring brakes 26 and 27, thereby releasing the ring gear 17 and preventing the further transmission of torque through the gear system. When the yoke 50 is raised after contacting one of the stop screws 60, it also raises a pin 61 which is screwed into the outer end of the yoke and which is adapted to fit into a slot 62 formed in a sleeve 63 which is rotatably arranged about the outer end of the sleeve 32. This sleeve 63 is formed with an outwardly extending flange which extends between a pair of friction elements 64 secured within a retaining cup 65 which is mounted on a flange on the cup-shaped element 29. When the yoke 50 raises the pin 61 out of the slot 62, it permits the sleeve 63 to rotate a slight amount, together with the cup-shaped member 29 which is fastened to the shaft 24 until one of a pair of cams 66 formed on the sleeve 63 engages an operating finger 67 on one or the other of the limit switches 59, so as to open one of these switches and open the circuit of the driving motor and the solenoid exciting coil 52, thus removing power from the driving mechanism and releasing the biasing force on the locking pin 45. This overload release prevents further operation of the motor in the same direction of rotation as that in which it was operating at the time the overload removed power from the system.

In order to apply torque to the gear system after such an overload release, the contactor 57 of the selector switch must be closed on the other contact 58 from the one on which it was closed when the overload occurred. Closing the selector switch on one or the other of the contacts 58 provides for energizing the motor through one or the other of the two field exciting windings 10 and through one of the limit switches 59. As soon as the motor rotates the drive shaft 12, the sleeve 63 is rotated by a frictional engagement with the friction element 64 in the opposite direction from the direction which opened one of the load release limit switches 59. This permits the pin 61 to drop into the slot 62, thereby permitting the exciting coil 52 to draw the armature 53 downwardly so as to bias the locking pin 45 into engagement with the stop ring 42, thus again causing engagement of one or the other of the spring brakes 26 or 27. This again locks the gear system, such that the ring gear 15 does not rotate and torque can be transmitted through the planetary system from the motor drive shaft 12 to the driven shaft 14.

In case of electric power failure or if it is desired to stop the driving motor and no overload condition has occurred, it may be desirable to drive the unit in the same direction of rotation as before it was stopped. In order to accomplish this, a biasing spring 68 is arranged in engagement with the lower part of the yoke 50, so as to bias the yoke 50 in a downward direction, thus biasing the pin 61 downwardly into the slot 62 of the sleeve 63 and preventing the sleeve 63 from rotating any further than the rotation of the yoke 50 as limited by the stop screws 60. Thus, if the electrical system is deenergized without overload, the spring 47 will lift the locking pin 45 out of engagement with the stop ring 42, releasing the load, but the spring 68 will prevent the yoke 50 from being lifted and, therefore, will prevent the rotation of the sleeve 63 to such an extent that one of the cams 66 will engage one of the operating fingers 67 and open one of the limit switches 59. Thus, the energizing circuit through the selector switch 57 need not be changed, and reenergization of the electrical system will permit the solenoid exciting coil 52 to bias the locking pin 45 into engagement with the stop ring 42 to provide the desired engaged brake position for the transmittal of torque through the gear system.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A brake mechanism for a rotatable shaft adapted to be driven by an external source of power, said mechanism including spring brake means having one end secured to said shaft, means including a rotatably supported brake sleeve means having one end held stationary, said spring brake means being arranged within said sleeve, means for restraining the free rotation of said spring brake means with said shaft, resilient means for biasing said restraining means away from engagement with said spring brake means, electro-magnetic means adapted to be excited by an external source for actuating said restraining means whereby said spring brake means are expanded to engage said sleeve when said electro-magnetic means is energized and to release said restraining means whereby said spring brake means freely rotates when said electro-magnetic means is deenergized, yoke means pivotally mounted on said sleeve and adapted to rotate therewith, and means to limit the rotation of said yoke, said yoke being adapted to pivot when so limited to release said restraining means.

2. A brake mechanism for a rotatable shaft adapted to be driven by an external source of power, said mechanism including a plurality of spring brake means surrounding said shaft, each of said spring brake means having one end secured to said shaft, means including a rotatably supported brake sleeve means having one end held stationary, said spring brake means being arranged within said sleeve, means to engage the free ends of said spring brake, means to engage said engaging means to prevent rotation thereof whereby said spring brake means expand into engagement with said sleeve on rotation of said shaft transmitting torque to said sleeve, resilient means for biasing said second named engaging means away from said first named engaging means, electro-magnetic means adapted to be excited from an external source for biasing said second named engaging means into engagement with said first named engaging means when said electro-magnetic means is energized, yoke means pivotally mounted on said sleeve means and adapted to rotate with said sleeve, said yoke being adapted to engage said second named engaging means, and means to limit the rotation of said yoke, said yoke being adapted to pivot when its rotation is limited by said limiting means, said yoke when so pivoted engaging said second named engaging means to release said first named engaging means whereby said spring brake means are free to rotate.

3. A brake mechanism for a rotatable shaft adapted to be driven by an external source of power, said mechanism including a pair of spring brake means surrounding said shaft, each of said spring brake means having one end secured to said shaft, means including a rotatably supported brake sleeve means surrounding said shaft and said spring brake means and having one end held stationary, a stop ring surrounding said shaft between said spring brake means for engaging the free ends of said spring brake means, a locking pin adapted to engage said stop ring to prevent rotation of said ring whereby said spring brake means expand into engagement with said sleeve on rotation of said shaft transmitting torque to said sleeve, resilient means for biasing said locking pin away from said stop ring, electromagnetic means having an exciting coil adapted to be energized from an external source for biasing said locking pin into engagement with said stop ring when said coil is energized, yoke means pivotally mounted on said sleeve and adapted to rotate with said sleeve, said yoke being adapted to engage said locking pin, resilient means for biasing said yoke away from said locking pin, and means to limit the rotation of said yoke, said yoke being adapted to pivot when its rotation is limited by said limiting means, said yoke when so pivoted engaging said locking pin to release said stop ring whereby said spring brake means are free to rotate.

CLEOPHOS E. ANDERSON.

REFERENCES CITED

The following references are of record in the file of this patent:

UNITED STATES PATENTS

| Number | Name | Date |
| --- | --- | --- |
| 1,321,618 | Fynn | Nov. 11, 1919 |
| 1,702,479 | Mosch | Feb. 19, 1929 |
| 1,708,941 | Dean | Apr. 16, 1929 |
| 1,727,757 | Dow | Sept. 10, 1929 |
| 1,948,709 | Hackethal | Feb. 27, 1934 |
| 2,086,030 | Hodgson | July 6, 1937 |
| 2,166,512 | Warwick | July 18, 1939 |
| 2,205,235 | Arnold | June 18, 1940 |
| 2,222,716 | Mageoch | Nov. 26, 1940 |